United States Patent
O'Neill

(10) Patent No.: US 9,364,897 B2
(45) Date of Patent: Jun. 14, 2016

(54) METHOD AND APPARATUS FOR RECONDITIONING OXIDIZED POWDER

(71) Applicant: United Technologies Corporation, Hartford, CT (US)

(72) Inventor: Christopher F. O'Neill, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 689 days.

(21) Appl. No.: 13/730,903

(22) Filed: Dec. 29, 2012

(65) Prior Publication Data
US 2014/0186205 A1    Jul. 3, 2014

(51) Int. Cl.
*B22F 1/00*    (2006.01)
*B22F 3/105*    (2006.01)

(52) U.S. Cl.
CPC ............. *B22F 1/0081* (2013.01); *B22F 1/0088* (2013.01); *B22F 3/1055* (2013.01); *B22F 2003/1059* (2013.01); *B22F 2999/00* (2013.01); *Y02P 10/24* (2015.11); *Y02P 10/295* (2015.11)

(58) Field of Classification Search
CPC ...................................................... B22F 1/0081
USPC ........................................................ 266/168
See application file for complete search history.

(56) References Cited

U.S. PATENT DOCUMENTS

| | | | |
|---|---|---|---|
| 2,277,067 A | * | 3/1942 | Brassert ................. C21B 13/00 75/10.14 |
| 2,306,665 A | | 12/1942 | Schwarzkopf |
| 2,340,346 A | | 2/1944 | Riveroll |
| 2,759,808 A | | 8/1956 | Kuzmick et al. |
| 2,912,320 A | | 11/1959 | Chang |
| 3,214,264 A | | 10/1965 | Bogdandy |
| 3,353,951 A | | 11/1967 | Shafer et al. |
| 3,419,383 A | | 12/1968 | Hatcher et al. |
| 3,957,482 A | | 5/1976 | Whigham |
| 3,966,454 A | | 6/1976 | Ito et al. |
| 4,147,334 A | | 4/1979 | Lafont et al. |
| 4,209,320 A | | 6/1980 | Kajinaga et al. |
| 4,294,609 A | | 10/1981 | Taricco |
| 5,405,572 A | | 4/1995 | DeVolk |

FOREIGN PATENT DOCUMENTS

GB        818236        8/1959

OTHER PUBLICATIONS

Article entitled, "Metal Powder Reduction Steel Belt Furnace", Advanced Corporation for Materials & Equipments, Alibaba.com, pp. 1-4, accessed Sep. 24, 2012.

* cited by examiner

*Primary Examiner* — Scott Kastler
(74) *Attorney, Agent, or Firm* — Kinney & Lange, P.A.

(57) ABSTRACT

A metal powder reconditioning apparatus and method recondition contaminated residual powder from an additive manufacturing device. The apparatus and method include a reducing chamber that receives contaminated residual powder resulting from an additive manufacturing process and remove oxygen from the contaminated residual powder to produce reconditioned powder. The reconditioned powder may be reused in the additive manufacturing process, or may be stored in a non-oxidizing atmosphere for later reuse.

18 Claims, 2 Drawing Sheets

METHOD AND APPARATUS FOR RECONDITIONING OXIDIZED POWDER

BACKGROUND

Additive manufacturing is a process by which three-dimensional objects may be manufactured from a powder or liquid base. Examples of additive manufacturing processes include stereolithography, selective laser sintering (SLS), direct metal laser sintering (DMLS), electron beam melting (EBM), and laser powder deposition (LPD). Each of these methods may be used to create objects which are not possible to make using subtractive manufacturing or machining.

Stereolithography is the process of filling a chamber with photosensitive liquid in layers. As each layer is filled, a light source hardens thin layers or slices of the desired three-dimensional object. When the desired object has been built up in a layerwise fashion, the unused photosensitive liquid is removed.

SLS is a similar process to stereolithography, but with a powder base rather than a photosensitive liquid. For example, SLS may use a powdered polymer, or a polymer/metal blend. Furthermore, SLS uses a laser, often a CO2 laser, to sinter or melt the powder. SLS is often used to create so-called "green bodies" for use in subsequent molding.

DMLS, like SLS, uses a powder base. However, DMLS uses only metal powders. A single metal or a blend of metals may be used. DMLS also uses a laser as a sintering or melting source. Once a three-dimensional object has been created using DMLS, residual powder is removed. Often, there is enough oxidized, contaminated powder in the residual powder that it is unusable for future additive manufacturing.

EBM is similar to DMLS, but rather than using a laser beam an electron beam is used for heating the target powder. As with DMLS, unsintered residual powder may be too oxidized for use in future additive manufacturing.

LPD uses a laser head to deposit powder only in those regions where it is to be melted. Thus, where other additive manufacturing techniques may have layers or slices of any geometry, each layer or slice in an LPD design must be supported by a sintered layer beneath it. Thus, LPD leaves fewer design options, but results in less contaminated powder.

Each of the foregoing additive manufacturing techniques may be used to create complex three-dimensional structures that cannot be made using subtractive manufacturing (e.g. machining). However, these techniques either suffer from their own design limitations (as with LPD) or from large quantities of waste material (as with DMLS, SLS, stereolithography, or EBM).

SUMMARY

A metal powder reconditioning apparatus and a method for reconditioning residual metal powder from an additive manufacturing process are disclosed. The metal powder reconditioning apparatus includes an additive manufacturing device, a reducing chamber, and a conveyor for transporting contaminated powder from the additive manufacturing device to the reducing chamber. The method includes additively manufacturing an object, and gathering for reconditioning the powder contaminated by additively manufacturing that object. After the contaminated powder is gathered, it is reconditioned by removal of oxides.

DETAILED DESCRIPTION

Figure 1:
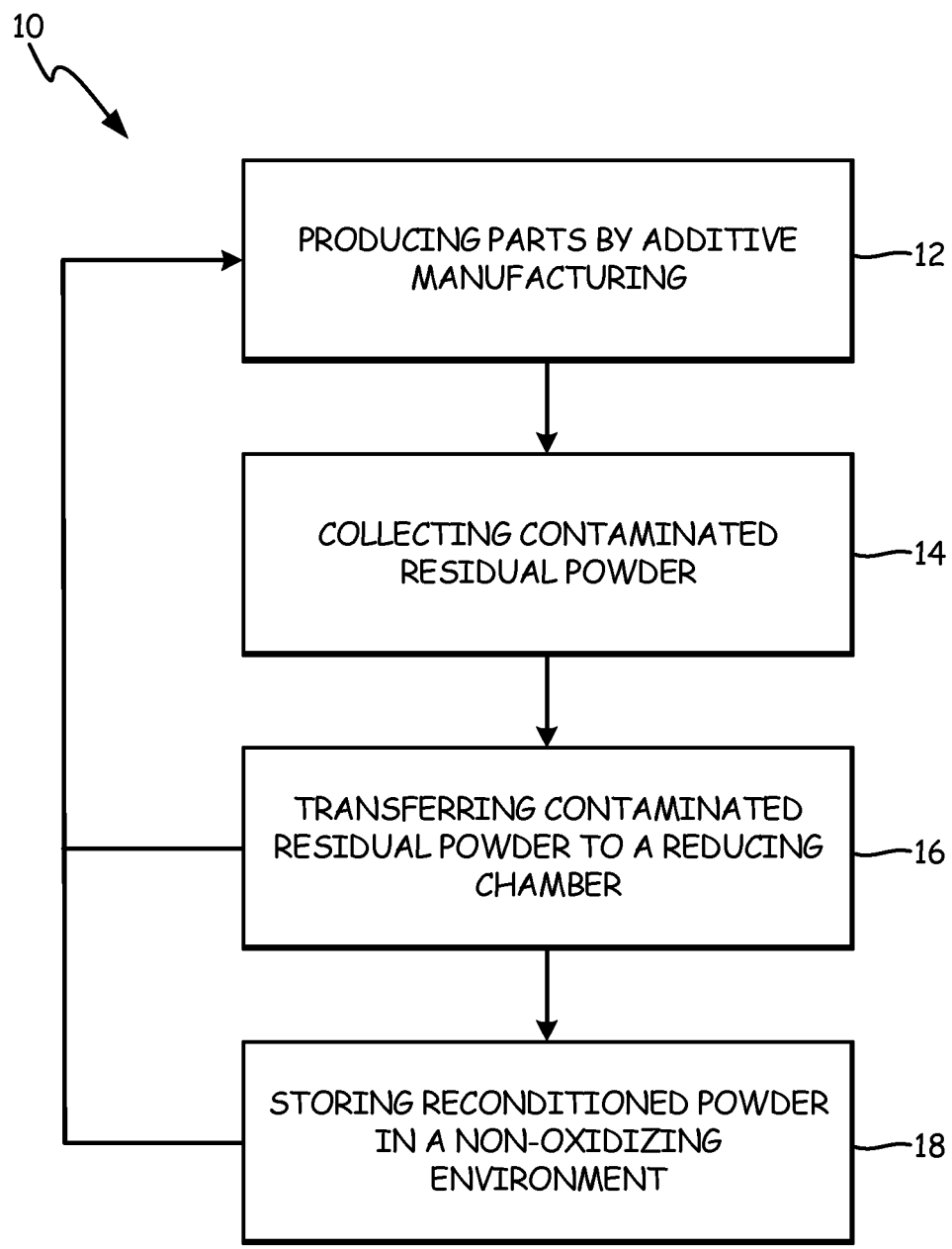
FIG. 1 is a schematic block diagram of a method incorporating the present invention.

FIG. 1 shows a flow chart of cycle 10 for reconditioning and reusing contaminated pulverant material from an additive manufacturing process. Cycle 10 includes producing parts by additive manufacturing (step 12), collecting contaminated residual powder from the additive manufacturing process (step 14), transferring the contaminated powder to a reducing chamber (step 16), optionally storing the powder in a non-oxidizing environment (step 18), and reusing the powder for producing parts by additive manufacturing (step 12).

Producing parts by additive manufacturing (step 12) includes producing a component by any additive manufacturing process that uses pulverant material for the base material and creates contaminated waste powder. For example, Direct Metal Laser Sintering uses pulverant metal granules to create an additively manufactured metal part. Finished parts are removed from the additive manufacturing apparatus, and unused, contaminated powder remains.

Collecting contaminated powder (step 14) includes gathering residual powder which was used in producing parts by additive manufacturing (step 12), but which were not part of the finished part. Often a large percentage of the powder used in additive manufacturing is not sintered to become a finished part. This unused, contaminated residual powder may be oxidized or even partially sintered during the process of producing parts by additive manufacturing (step 12). Often, the residual powder is contaminated to such an extent that it would be unusable in future additive manufacturing processes.

After collecting contaminated powder (step 14), the contaminated powder is transferred to a reducing chamber (step 16). The contaminated residual powder may be conveyed in any of a number of ways, such as on a conveyor belt, a screw, in a batch, or carried by hand. The reducing chamber is any chamber which includes a reducing fluid, such as hydrogen gas or a reducing liquid. Optionally, the reducing chamber may be heated to accelerate reduction of the contaminated powder. The contaminated residual powder may be left in the reducing chamber for sufficient time to remove oxidation incurred during production of parts by additive manufacturing (step 12). In some embodiments, transferring contaminated residual powder to a reducing chamber includes using a screw or other mechanism to generate turbulence and mixing of the contaminated powder. Generating turbulence and mixing of the contaminated residual powder exposes all of the contaminated powder to the reducing fluid. After transferring contaminated powder to a reducing chamber (step 16), the contaminated powder becomes reconditioned powder, and may be used in subsequent production of parts (step 12).

After the contaminated powder has gone through the reducing chamber, cycle 10 optionally includes storing the reconditioned powder in a non-oxidizing environment (step 18). The non-oxidizing environment could be, for example, a hermetically sealed container purged with an inert gas. Alternatively, the non-oxidizing environment could be a hermetically sealed container purged with a reducing gas, or one under vacuum. Storing powder in a non-oxidizing environment 18 allows for use of the reconditioned powder at a later time. Storing powder in a non-oxidizing environment 18 is not necessary if cycle 10 includes producing parts 10 immediately upon removal of the reconditioned powder from the reducing chamber. In that scenario, the reconditioned powder may be used immediately in step 12 for producing parts by additive manufacturing.

Cycle 10 reduces waste in additive manufacturing. Often, materials used for additive manufacturing are difficult to create and expensive to purchase. Discarding all or a large portion of contaminated residual powder after producing parts, or even recycling contaminated metal powder into non-powder metals, results in waste and expense. Cycle 10 allows for very high rates of recovery of contaminated residual powder for use in subsequent additive manufacturing.

Figure 2:
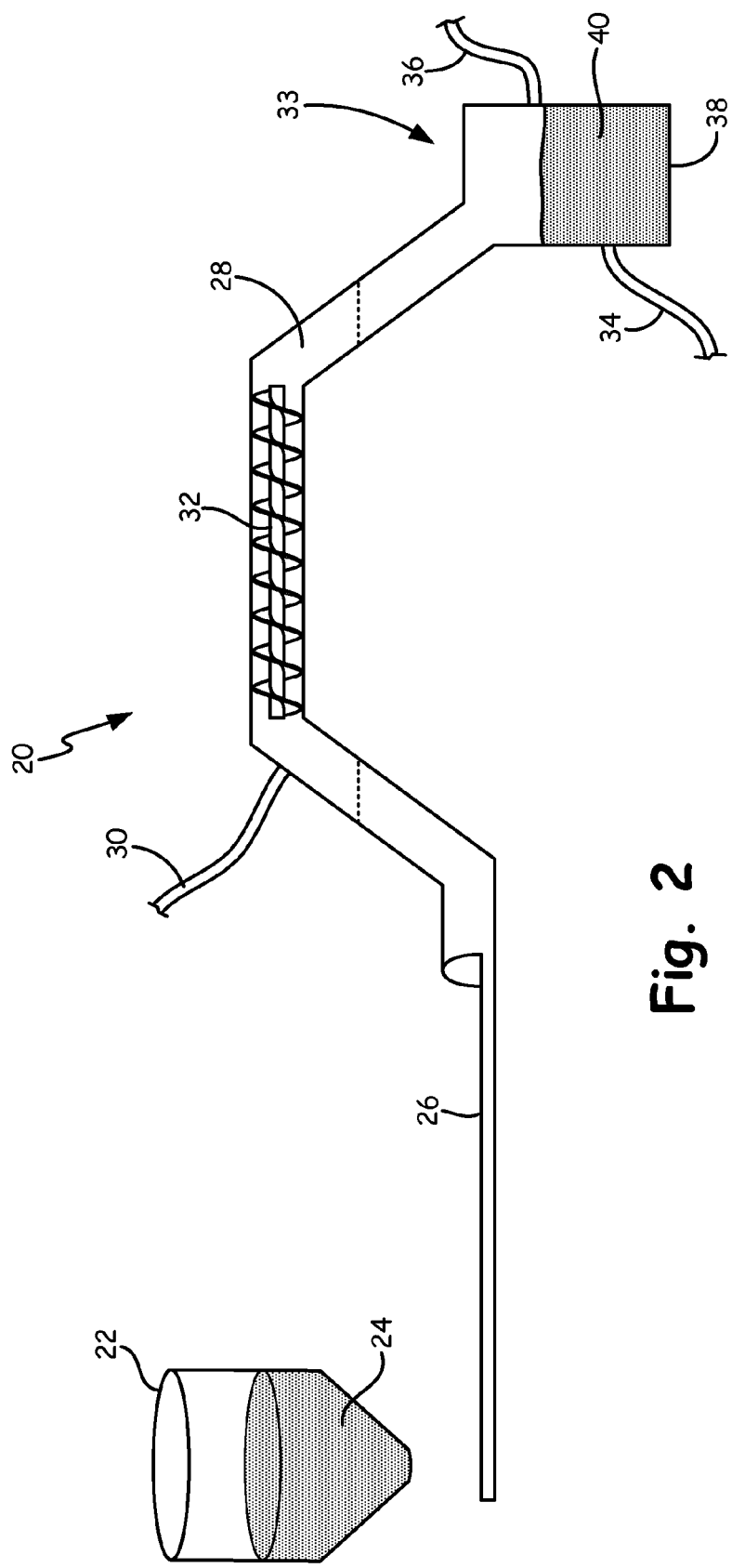
FIG. 2 is a schematic view of a metal reconditioning apparatus of the present invention.

FIG. 2 shows a simplified schematic of apparatus 20 for reconditioning a contaminated residual powder from an additive manufacturing process. Apparatus 20 includes hopper 22 for collecting contaminated residual powder 24, conveyor 26, reducing chamber 28, and inert storage chamber 33. Hopper 22 is any container suitable for holding powder, and has an outlet (not shown) for selectively dispensing powders therein. Contaminated residual powder 24 is powder generated during additive manufacturing, such as metallic powder, at least some of which has been oxidized during additive manufacturing. Conveyor 26 is any system for conveyance. As shown in FIG. 2, conveyor 26 is a conveyor belt. However, in alternative embodiments, conveyor 26 may be a screw or other mechanical means of conveyance, or conveyor 26 may be eliminated and contaminated residual powder 24 may be deposited directly into reducing chamber 28. Hopper 22 may deliver contaminated residual powder 24 to conveyor 26, and conveyor 26 may transfer contaminated residual powder 24 to reducing chamber 28.

Reducing chamber 28 accepts contaminated residual powder 24 and also includes reducing fluid inlet 30 and reducing chamber screw 32. While in reducing chamber 28, contaminated residual powder 24 is subjected to a reducing atmosphere. The fluid that makes up the reducing atmosphere is provided by reducing fluid inlet 30. In order to accelerate reduction of contaminated residual powder 24, reducing chamber 28 includes reducing chamber screw 32. Reducing chamber screw 32 agitates and/or mixes contaminated residual powder 24 as it passes through reducing chamber 28 in order to promote contact between the reducing atmosphere of reducing chamber 28 and all of contaminated residual powder 24. In alternative embodiments, reducing chamber screw 32 may not be necessary, or may be any other device which mixes contaminated residual powder 24 in such a way as to promote contact between all of contaminated residual powder 24 and the reducing atmosphere.

Upon exiting reducing chamber 28, contaminated residual powder 24 has been sufficiently reduced that it is now reconditioned powder 40. Further steps may be taken to ensure that reconditioned powder 40 is suitable for use in subsequent additive manufacturing processes. For example, reconditioned powder 40 may be sieved in order to ensure that reconditioned powder 40 is made of granules of an appropriate size.

Reconditioned powder 40 is transferred to inert storage container 33. Inert storage container 33 in the embodiment shown in FIG. 2 includes hermetically sealed housing 38, inert gas inlet 34, and inert gas outlet 36. Hermetically sealed housing 38 prevents contamination of reconditioned powder 40 by oxidants. Inert gas inlet 34 and inert gas outlet 36 admit and remove gas from hermetically sealed housing 38 in order to ensure that the atmosphere surrounding reconditioned powder 40 is either inert or reducing. In alternative embodiments, inert storage container 33 may be under vacuum. When reconditioned powder 40 is used in subsequent production of additively manufactured parts (FIG. 1, step 12), inert storage container 33 may be transferred to the additive manufacturing apparatus and unsealed. In yet other embodiments, inert storage container 33 may be eliminated and reconditioned powder 40 may be delivered directly to an additive manufacturing device (not shown).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A metal powder reconditioning apparatus comprising:
an additive manufacturing device configured and operable to produce a metal object from a pulverant material, wherein production of the metal object from the pulverant material generates contaminated residual powder;
a reducing chamber configured to receive the contaminated residual powder produced by the additive manufacturing device, wherein the reducing chamber produces reconditioned powder by removing oxygen from the contaminated residual powder;
a container configured to collect the contaminated residual powder from the additive manufacturing device; and
a conveyor configured to receive the contaminated residual powder from the container and transport the contaminated residual powder to the reducing chamber.

2. The metal powder reconditioning apparatus of claim 1, wherein the reducing chamber is heated to maintain a desired temperature.

3. The metal powder reconditioning apparatus of claim 1, and further comprising a reducing fluid inlet connected to the reducing chamber.

4. The metal powder reconditioning apparatus of claim 1, and further comprising:
an inerting chamber for storing the reconditioned powder in a non-oxidizing environment, wherein the inerting chamber comprises a hermetically sealed chamber.

5. The metal powder reconditioning apparatus of claim 1, wherein the conveyor is one of a conveyor belt or a screw.

6. The metal powder reconditioning apparatus of claim 4, further comprising an inert gas inlet and an inert gas outlet connected to the hermetically sealed chamber.

7. The metal powder reconditioning apparatus of claim 6, wherein the hermetically sealed chamber is under vacuum.

8. The metal powder reconditioning apparatus of claim 6, wherein the inert gas inlet and the inert gas outlet are configured to pass an inert fluid through the hermetically sealed chamber.

9. The metal powder reconditioning apparatus of claim 6, wherein the inert gas inlet and the inert gas outlet are configured to pass a reducing fluid through the hermetically sealed chamber.

10. The metal powder reconditioning apparatus of claim 3, wherein the reducing fluid inlet is configured to pass hydrogen through the reducing chamber.

11. The metal powder reconditioning apparatus of claim 1, wherein the reducing chamber is arranged above the conveyor.

12. A method for reconditioning metal powder, the method comprising:

producing by additive manufacturing a metal object from a pulverant material, wherein production of the metal object from the pulverant material generates contaminated residual powder;

collecting, by a container, the contaminated residual powder resulting from the additive manufacturing;

transporting, by a conveyor, the contaminated residual powder from the container to a reducing chamber; and producing, at the reducing chamber, reconditioned powder suitable for use in additive manufacturing by removing oxygen from the contaminated residual powder.

13. The method of claim 12, wherein producing the reconditioned powder includes heating the contaminated residual powder in the reducing chamber.

14. The method of claim 12, wherein producing the reconditioned powder includes purging the reducing chamber with a reducing fluid.

15. The method of claim 14, wherein producing the reconditioned powder includes tumbling the contaminated residual powder within the reducing chamber in the presence of the reducing fluid until the contaminated residual powder is converted to reconditioned powder with less than a specified level of oxidation.

16. The method of claim 14, wherein the reducing fluid includes hydrogen gas.

17. The method of claim 12, further comprising storing the reconditioned powder in a non-oxidizing environment.

18. The method of claim 12, and further comprising sieving the reconditioned powder in order to remove reconditioned powder of undesirable sizes.

\* \* \* \* \*